Nov. 17, 1925.

H. Y. STEBBINS ET AL 1,562,265

SIX-WHEEL TRUCK

Filed Feb. 23, 1924

2 Sheets-Sheet 1

INVENTORS
Harry Y. Stebbins
David Leroy Van Leuven
BY Westall and Wallace
ATTORNEYS Nov. 17, 1925.  
H. Y. STEBBINS ET AL  
1,562,265  
SIX-WHEEL TRUCK  
Filed Feb. 23, 1924    2 Sheets-Sheet 2
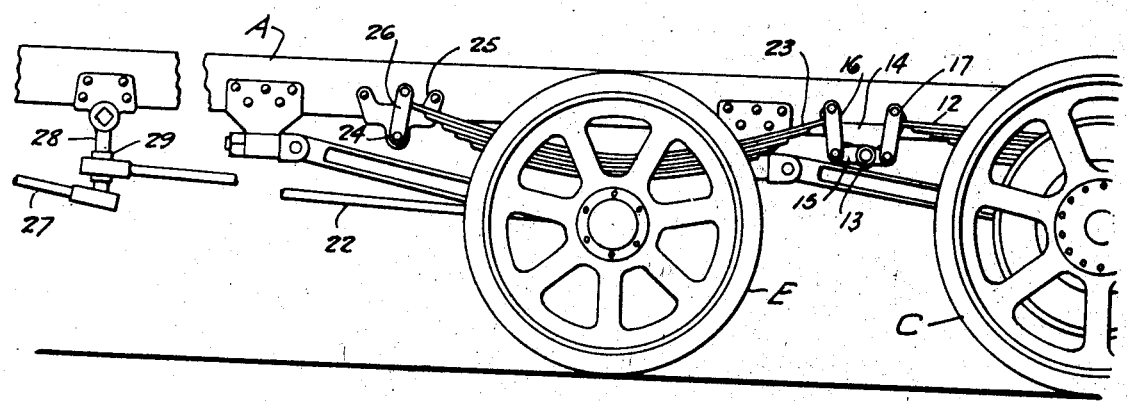
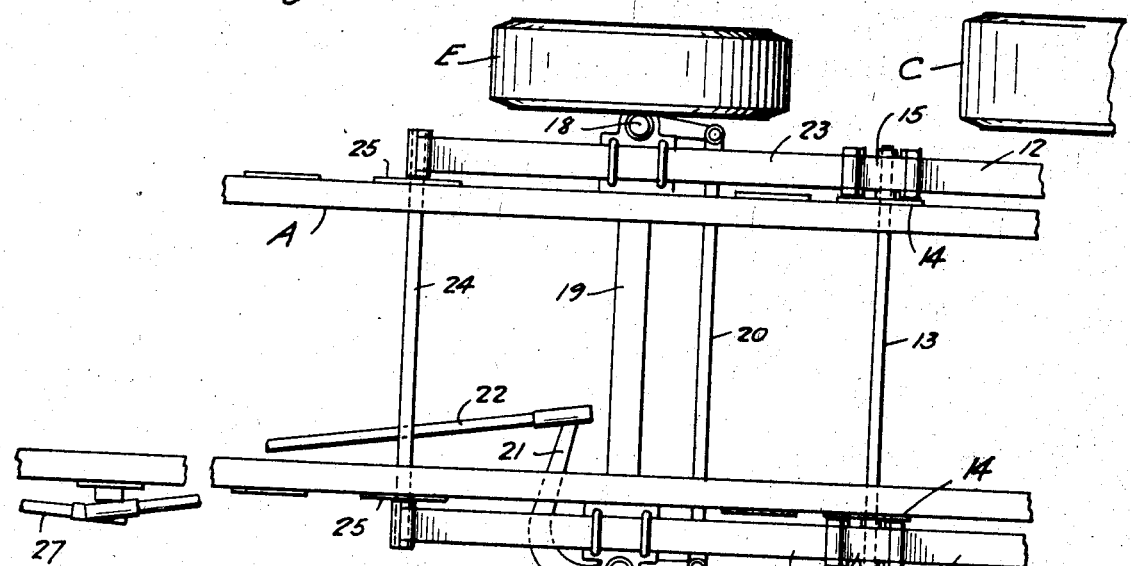
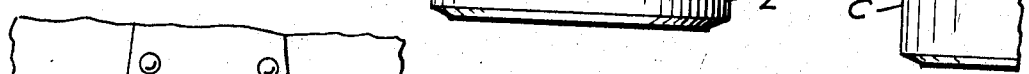
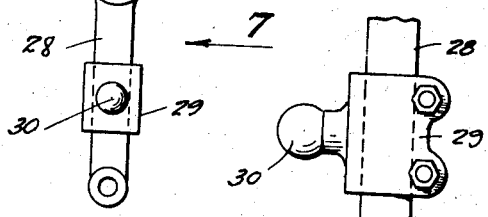
INVENTORS  
Harry Y. Stebbins  
BY David Leroy VanLeuven  
Westall and Wallace  
ATTORNEYS Patented Nov. 17, 1925.

1,562,265

UNITED STATES PATENT OFFICE.

HARRY Y. STEBBINS AND DAVID LEROY VAN LEUVEN, OF LOS ANGELES, CALIFORNIA, ASSIGNORS TO SIX WHEELS, INCORPORATED, OF LOS ANGELES, CALIFORNIA, A CORPORATION OF CALIFORNIA.

SIX-WHEEL TRUCK.

Application filed February 23, 1924. Serial No. 694,591.

*To all whom it may concern:*

Be it known that we, HARRY Y. STEBBINS and DAVID LEROY VAN LEUVEN, citizens of the United States, and residents of Los Angeles, in the county of Los Angeles, State of California, have invented new and useful Improvements in a Six-Wheel Truck, of which the following is a specification.

This invention relates to a motor vehicle employing six or more wheels and pertains particularly to a vehicle having four or more carrier wheels.

In order to decrease the load per wheel upon a road surface and yet carry a relatively large load upon the vehicle, it becomes necessary to increase the tread of the tires or the number of wheels. The present invention relates to a vehicle having four or more carrier wheels and two or more drive wheels. The embodiment shown herein has two drive wheels. The objects of this invention are first, to provide a vehicle having four or more carrier wheels interconnected for steering; second, to provide a vehicle having a pair of intermediate carrier wheels mounted so that the load borne by them and the drive wheels will be equalized; and third, to provide a construction whereby the vehicle frame is supported at three or more points, the load being proportionately divided regardless of its magnitude or the character of the road surface.

Figure 1:
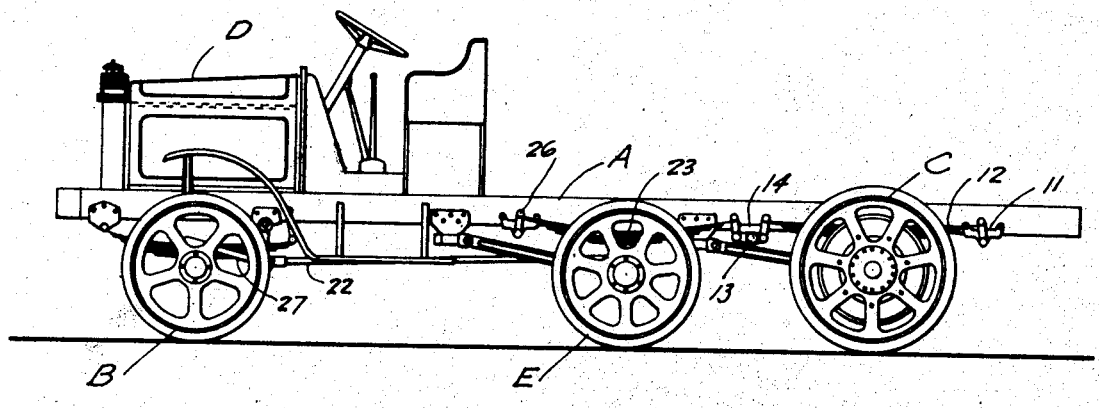
Figure 2:
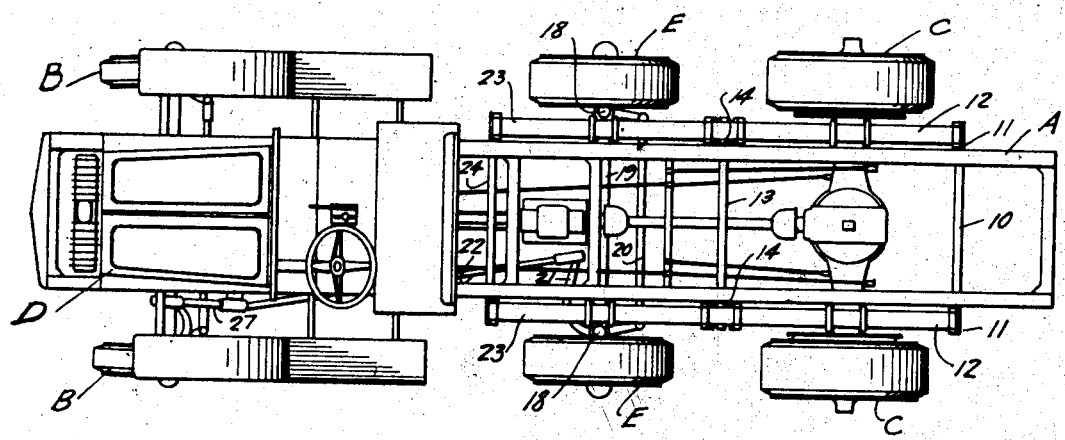
Figure 3:
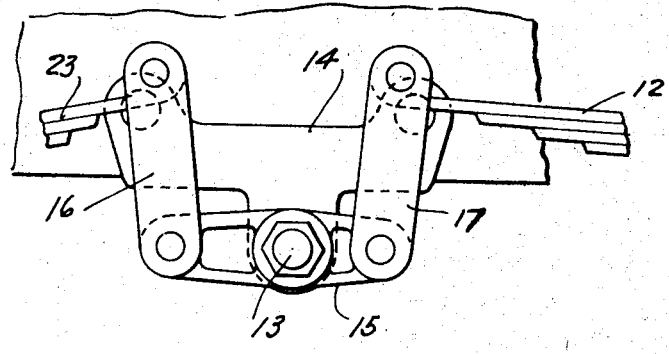

These objects together with other objects and corresponding accomplishments are obtained by means of the embodiment of our invention illustrated in the accompanying drawing, in which:

Fig. 1 is a side elevation of a six wheel truck; Fig. 2 is a plan view; Fig. 3 is a fragmentary view on an enlarged scale showing an equalizer shackle; Fig. 4 is a fragmentary view in elevation showing details of the intermediate carrier wheel mounting; Fig. 5 is a plan view of the structure shown in Fig. 4; Fig. 6 is a fragmentary view showing the connection between the steering mechanism for the front wheels and the intermediate wheels; and Fig. 7 is a fragmentary view on an enlarged scale looking in the direction of the arrow 7 of Fig. 6.

Referring more particularly to Figs. 1 and 2, the chassis of the truck is indicated by A. The vehicle's front wheels B are of the usual type and by means of which the truck may be steered. The drive wheels C are of the ordinary construction and are driven from a motor mounted under the hood D through the usual mechanism comprising a clutch, transmission gears, and a differential. The parts just described are those well known in the automobile art and the present structure does not depart from that which is commonly used. The invention resides in the intermediate carrier wheels E and their mounting.

As shown herein, there is a cross-bar 10 spanning the frame at the rear of the drive wheels. This cross-bar carries pivotally mounted shackles 11 supporting springs 12. The forward ends of the springs are secured to shackles of special construction. A cross-bar 13 spans the frame and at the ends thereof are brackets 14. Pivotally mounted upon the cross-bar 13 at the brackets are equalizer links 15, best shown in Fig. 3. Pivotally secured to the ends of the equalizer links are shackles 16 and 17. The end of each spring 12 is connected to a shackle 17, thus, providing for the mounting of the drive wheels.

The intermediate wheels are mounted upon axle spindles formed on steering knuckles 18 mounted upon an axle 19. The knuckles are tied together by a cross tube 20 secured to steering arm 21. Steering arm 21 is provided for connection to a drag link 22. The axle 19 is mounted upon springs 23 secured at the rear ends to shackles 16. Forward of the axle 19 is a cross bar 24 mounted in brackets 25 upon the frame and secured to springs 23 through shackles 26. In the present instance the tread of the intermediate carrier wheels is less than that of the drive wheels, and the drive wheels bear a greater proportion of the load of the vehicle than the carrier wheels. It will be noted from an inspection of Fig. 3 that the rear arm of equalizer link 15 is of less length than the forward. This provides for the intermediate carrier wheels taking a less proportion of the load than the drive wheels, the distribution being dependent upon the relative lengths of the arms of the equalizer link. The construction also provides for the drive wheels and intermediate carrier wheels riding over bumps and uneven places in the road and yet distributing the load.

The axle just described for the intermediate wheels mounting is of the type commonly employed for front axles. The front axle is of the same general construction except that its drag link 27 is secured to an arm 28 pivotally mounted upon the frame and operated from the steering wheel mechanism of the usual type. Mounted upon the arm 28 is a collar 29, see Fig. 6, so constructed that its position upon the arm 28 may be adjusted and thereby the linear travel for a given angular movement adjusted.

This construction provides a divided connecting bar with a proportional movement.

The collar is provided with a ball 30 to which a socket on the end of drag link 22 is connected. It is obvious that turning of the front wheels will cause a corresponding turning of the intermediate carrier wheels. This provides for the proper tracking of the wheels.

It will be apparent that more carrier wheels may be installed and all of the wheels tied together by steering mechanism of the character just described. It will also be apparent that the invention is not limited to the use of a pair of drive wheels as more may be used. However, the standard truck construction may have installed thereon without appreciable alteration of its parts, the added intermediate wheels. The position of the collar 29 will be adjusted to provide for proper steering dependent upon the position of the wheels on the truck frame, the length of the steering arm connected to the drag links and the length of the arm operating the drag links.

What we claim is:

In a motor vehicle, the combination of a frame, drive wheels, drive mechanism therefor, front wheels, steering mechanism therefor comprising movable spindles having steering knuckle arms, a tie rod connecting said arms, intermediate carrier wheels, steering mechanism for said carrier wheels comprising movable spindles having steering knuckle arms, a tie rod connecting said last mentioned arms, and a divided connecting bar securing said steering mechanisms together and having an adjustable proportional movement connection characterized by said connection comprising a lever pivotally mounted on said frame, a collar slidably mounted on said lever so as to be adjustably disposed thereon, means to lock said collar in any selected position on said lever, said collar having a ball, one section of said bar having a socket receiving said ball so as to form a joint, and the other section of said bar being non-adjustably connected to said lever so as to swing therewith.

In witness that we claim the foregoing we have hereunto subscribed our names this 13th day of February, 1924.

HARRY Y. STEBBINS.
DAVID LEROY VAN LEUVEN.